(12) United States Patent
Higgins

(10) Patent No.: US 8,840,143 B2
(45) Date of Patent: Sep. 23, 2014

(54) NOVELTY VEHICLE SIDE-STEP MODIFICATION KIT

(71) Applicant: Thomas Higgins, Wheaton, IL (US)

(72) Inventor: Thomas Higgins, Wheaton, IL (US)

( * ) Notice: Subject to any disclaimer, the term of this patent is extended or adjusted under 35 U.S.C. 154(b) by 0 days.

(21) Appl. No.: 13/964,147

(22) Filed: Aug. 12, 2013

(65) Prior Publication Data
US 2014/0062074 A1 Mar. 6, 2014

Related U.S. Application Data

(60) Provisional application No. 61/694,505, filed on Aug. 29, 2012.

(51) Int. Cl.
*B60R 3/00* (2006.01)

(52) U.S. Cl.
CPC .. *B60R 3/00* (2013.01); *B60R 3/002* (2013.01)
USPC ............................. 280/762; 280/163; 280/169

(58) Field of Classification Search
CPC ....................................................... B60R 3/002
USPC .................... 280/762, 763.1, 163, 164.1, 169
See application file for complete search history.

(56) References Cited

U.S. PATENT DOCUMENTS

| | | | | |
|---|---|---|---|---|
| D330,536 S | * | 10/1992 | Holloway et al. | D12/203 |
| D351,128 S | * | 10/1994 | Waddington et al. | D12/203 |
| 5,382,035 A | | 1/1995 | Waddington | |
| 5,915,830 A | * | 6/1999 | Dickson et al. | 362/495 |
| 6,203,040 B1 | * | 3/2001 | Hutchins | 280/169 |
| 6,250,785 B1 | * | 6/2001 | Mallia et al. | 362/511 |
| D471,848 S | * | 3/2003 | Farkash | D12/203 |
| D504,374 S | * | 4/2005 | Hendrix | D12/203 |
| D513,725 S | * | 1/2006 | Metros et al. | D12/203 |
| 7,070,194 B2 | * | 7/2006 | Garland et al. | 280/166 |
| 7,287,770 B2 | * | 10/2007 | Drabant et al. | 280/163 |
| 7,513,520 B2 | * | 4/2009 | Okuyama | 280/166 |
| 7,513,565 B2 | * | 4/2009 | Watson | 296/199 |
| 7,708,294 B2 | * | 5/2010 | Demick | 280/164.1 |
| 8,016,309 B2 | * | 9/2011 | Flajnik et al. | 280/169 |
| 8,136,826 B2 | * | 3/2012 | Watson | 280/166 |
| 8,231,134 B2 | * | 7/2012 | Huang-Tsai | 280/169 |
| 8,596,662 B2 | * | 12/2013 | Huang-Tsai | 280/169 |
| 8,641,068 B1 | * | 2/2014 | Bundy | 280/163 |
| 2003/0189837 A1 | * | 10/2003 | Potter et al. | 362/495 |
| 2004/0173987 A1 | * | 9/2004 | Chapman et al. | 280/163 |
| 2004/0256832 A1 | * | 12/2004 | Bradsen et al. | 280/163 |
| 2005/0087950 A1 | * | 4/2005 | Draper et al. | 280/163 |
| 2006/0001229 A1 | * | 1/2006 | Kayne | 280/163 |
| 2006/0208449 A1 | * | 9/2006 | Kuo et al. | 280/163 |
| 2008/0258421 A1 | * | 10/2008 | Crandall | 280/163 |
| 2009/0121449 A1 | * | 5/2009 | Kuntze et al. | 280/163 |

(Continued)

*Primary Examiner* — Jeffrey J Restifo
*Assistant Examiner* — Erez Gurari
(74) *Attorney, Agent, or Firm* — Daniel Boudwin; Global Intellectual Property Agency LLC

(57) ABSTRACT

A novelty vehicle side step accessory kit is provided that offers users an interactive and aesthetically pleasing means of customizing their vehicle. The device has one or more pressure plates disposed on a vehicle side rail. Two end portions are disposed on opposing ends of the side rail. These end portions are thematically decorated to resemble an animal, vehicle, plane, or other object. A sound emitter is disposed within the front end portion and a motion generator is disposed within the rear end portion. Both elements are electrically connected to the pressure sensitive plate. When a user steps on the pressure plate the sound emitter and motion generator are activated, creating audible and tactile feedback.

9 Claims, 2 Drawing Sheets

(56) References Cited

U.S. PATENT DOCUMENTS

2009/0267374 A1* 10/2009 Mulder .................. 296/37.1
2010/0244397 A1* 9/2010 Huang-Tsai ................ 280/163
2011/0079981 A1* 4/2011 McFarlane ................ 280/163
2011/0266766 A1* 11/2011 Huang-Tsai ................ 280/169
2011/0309595 A1* 12/2011 Huang-Tsai ................ 280/169
2012/0098230 A1* 4/2012 Kuntze et al. ................ 280/163
2012/0104718 A1* 5/2012 Alvarez et al. ................ 280/163
2014/0027996 A1* 1/2014 Chen ................ 280/163
2014/0062074 A1* 3/2014 Higgins ................ 280/762

* cited by examiner

NOVELTY VEHICLE SIDE-STEP MODIFICATION KIT

CROSS REFERENCE TO RELATED APPLICATION

This application claims the benefit of U.S. Provisional Application No. 61/694,505 filed on Aug. 29, 2012 entitled "Side-Step Rail Buddies." The patent application identified above is incorporated here by reference in its entirety to provide continuity of disclosure.

BACKGROUND OF THE INVENTION

1. Field of the Invention

The present invention relates to novelty vehicle accessories. More specifically, it relates to an attachment for a vehicle side-step. The device is a side step modification kit having one or more pressure sensitive plates, a front end portion shaped like an animal head, and a back end portion shaped like an animal tail. A sound box located within the front portion emits auditory signals similar to that of the animal. Similarly, a vibration mechanism is disposed in the rear portion and wiggles the rear portion upon activation. When a user steps upon the pressure sensitize plate of the device an animal noise and tail waving motion are initiated. Thus the device is a novelty modification kit for a vehicle that will be appreciated by persons having children or those who wish to adorn the side-step of their automobiles.

The decoration of automobiles is a popular pastime and a favored form of expression for many vehicle owners. Personalization of a vehicle makes owners feel unique or identifiable. Some vehicle owners decorate their automobiles in order to make a statement of a political, creative, or religious nature. In this way, the vehicle owner can make a personal statement using visual décor rather than audible statements.

Custom paint schemes are a common means of personalizing a vehicle's exterior appearance. Racing stripes, tribal patterns, air brushing and other painting techniques provide visually unique décor to a vehicle. Similarly, uncommon color schemes also help an automobile stand out amongst the crowd. Specialty body shops offer a variety of custom coloring and design options to customers looking for a different look. Unfortunately, custom paint options are often costly and permanently change the look of the car. Further alteration is needed to modify the custom paint or rest it to a factory standard.

Decals and stickers are another popular means of personalizing a vehicle. Bumper stickers are short, elongated decals bearing a message that is often politically, religiously, or idealistically motivated. These stickers are ideally shaped and sized for placement on the rear bumper of a vehicle, thereby providing reading material to cars positioned behind the lead vehicle. Window "clings" are tacky plastic decals that are adhered to the inside of a car window using static or adhesive. Both of these options can be moved to different cars and positions on any given car.

The commonly available personalization means are not interactive. Further, they are entirely visual in nature and do not provide any audible feedback. A novelty personalization device is needed that provides a visually aesthetic exterior as offering audible feedback upon interaction.

2. Description of the Prior Art

The present invention is a novelty vehicle side step accessory that is interactive and provides both audio and visual feedback. The device has one or more a pressure plates that are secured along the top of a vehicle side rail. Secured at a first end of the side rail, is an animal head shaped end portion having an audio emission device electrically connected to the pressure plate(s). At the opposing end of the side step rail, is secured an animal tail with a vibrator or other motion generating device that causes the tail to wag or wiggle upon activation. This motion generation device is also electrically connected to the pressure sensitive plate. One or more batteries are disposed within the body, head, or tail portions and are electrically connected to all components.

Many types of side-step accessories are available to vehicle owners. A basic design for an accessory is shown in Blake, U.S. Design Pat. No. D513,725, which depicts a design for a vehicle step-side running board. Side-step end cap accessories are shown in Farkash, U.S. Design Pat. No. D471,848 and Hendrix, U.S. Design Pat. No. D504,374. Variations in design on these designs are readily available.

Hutchins, U.S. Pat. No. 6,203,040 discloses an adjustable side-step running board having an elongated deck with one integrated end cap. A support frame having damping bolts may be slideably positioned is affixed to the underside of the elongated deck. The elongated deck is free at an end opposing the integrated end caps so that the device may be cut to the length required by a particular vehicle. The second end-cap has a mounting shoulder that is bolted to the support frame to form the running board. Though the Hutchinson device is relevant to the present invention in that it is a side-step running board, it lacks the audio emitting means, the pressure sensitive plate, and the motion generator of the present invention.

Waddington, U.S. Pat. No. 5,382,035 depicts a vehicle running board. The running board attaches to a vehicle, it includes an elongated deck, a decorative overlay which covers the deck, and a pair of end caps. Tabs secure a deck overlay to the upper surface of the elongated deck. To prevent dirt and debris from accumulating on the deck, the end portions have vertical exterior sidewalls that provide a barrier between the tires and the elongated deck. The Waddington device is a running deck and therefore relevant to the present disclosure, but it does not include a pressure plate, an audio emitter or motion generator, like those of the present invention.

Dickson, U.S. Pat. No. 5,915,830 describes a lighted running board device for an automobile. The device is a light emitting assembly having a light tube filled with lights. This tube extends the length of an elongated running board deck. The light tube uniformly illuminates the surface of the running board and the ground surface below the running board. In this manner, the device assists in night time visibility and provides a visually attractive feature. Unlike the present invention, the Dickson device does not teach an audio emitter or a motion generator.

These prior art devices have several known drawbacks. They do not disclose audio emitting means or a motion generator that moves an end portion of the side-step running board device. Therefore the prior art devices do not provide an interactive side step modification kit or device that provides noise and movement upon engagement. It substantially diverges in design elements from the prior art and consequently it is clear that there is a need in the art for an improvement to existing novelty side-step accessory kits and devices. In this regard the instant invention substantially fulfills these needs.

SUMMARY OF THE INVENTION

In view of the foregoing disadvantages inherent in the known types of novelty side-step accessories now present in the prior art, the present invention provides a new interactive multi-sensory feature wherein the same can be utilized for providing convenience for the user when personalizing their vehicles.

The novelty vehicle side-step accessory of the present invention provides an aesthetically pleasing and interactive personalization means. The device has at least one pressure plate electrically connected to two opposing end caps. A first end cap is shaped to resemble an animal head. A second end cap is shaped to resemble the tail of the animal whose head is depicted with the first end portion. Thus, the overall appearance of the device is that of an animal such as a pig, a cow, a dog, a bear, or other easily distinguishable animal.

The animal theme is further promoted by the inclusion of animal noises and tail wagging features that are activated when a user stands upon the pressure plates. The pressure sensitive plate(s) is installed onto the upper portion of a vehicle side step rail. When pressure is exerted upon this pressure plate, a sound emitting element in the first end cap (animal head) and a motion generator in the second end cap (animal tail) are activated. Emitted sound resembles the naturally occurring call of the depicted animal such as an oink for a pig, a moo for a cow, and so on.

The primary objective of the present invention is to provide a visually pleasing and entertaining vehicle accessory. Users will enjoy the animal sounds and tail wagging that occurs when they step on the deck. Children in particular will be entertained by the novelty device's appearance and animal noises.

It is therefore an object of the present invention to provide a new and improved novelty side-step accessory device that has all of the advantages of the prior art and none of the disadvantages.

It is therefore an object of the present invention to provide a vehicle side-step modification kit that has the appearance of an animal.

Another object of the present invention is to provide a vehicle side-step accessory that emits animal noises and has a motion feature.

Yet another object of the present invention is to provide an interactive vehicle side-step accessory that is activated when a user steps on the pressure plate of the installed modification kit.

Still another object of the present invention is to provide a vehicle side-step modification kit that is both visually appealing and entertaining to persons of all ages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
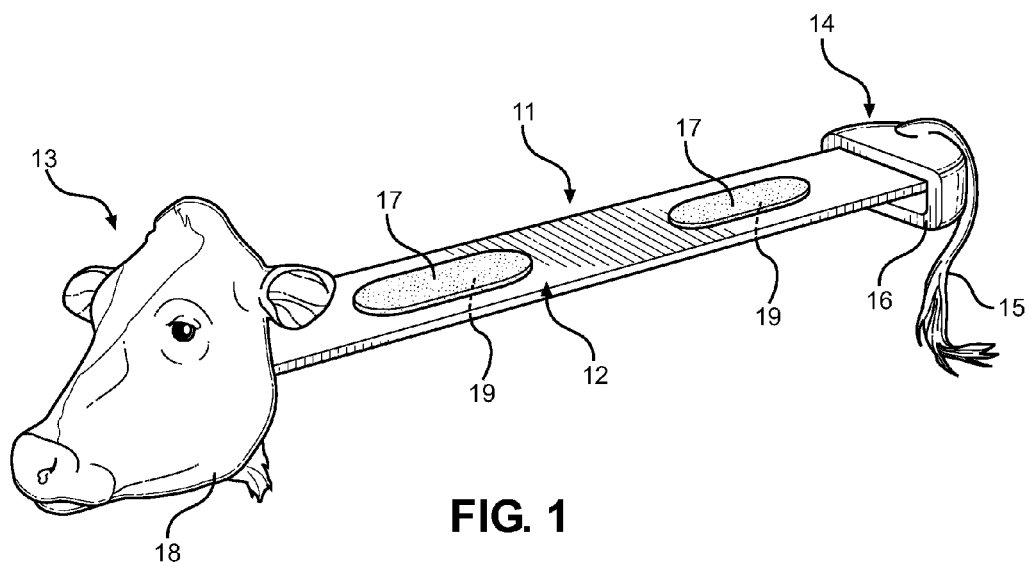
FIG. 1 shows a perspective view of the novelty side-step modification kit when assembled on a flat side rail. The assembled device has the appearance of a cow/with a bovine head and tail.

Reference is made herein to the attached drawings. Like reference numerals are used throughout the drawings to depict like or similar elements of the novelty side-step accessory. For the purposes of presenting a brief and clear description of the present invention, the preferred embodiment will be discussed as used for adorning the side-step of a vehicle. The figures are intended for representative purposes only and should not be considered to be limiting in any respect.

Referring now to FIG. 1, there is shown a bovine embodiment of the side step modification kit. The novelty side-step accessory 11 has a front end portion 13 connected to a vehicle side step rail 12, and a rear end portion 14 connected to an opposing end of the rail. One or more pressure sensitive plates 19 are installed along an upper surface of the side step rail and underneath step covers 17. Both end portions protrude from opposing ends of the side step rail and are decorated to resemble the head and tail of an animal. In the depicted example the front end portion is designed to resemble a cow head 18, while the rear end portion has a decoration that resembles a cow tail 15. Other animals may be substituted for the cow design, such as dogs, sheep, bears, goats, and any animal with a distinguishable call.

End portions are attached to the side step rail via fasteners, or adhesive. These end portions are end cap covers that protect opposing ends of a side step rail. Both end portions are hollow or quasi-hollow to permit electrical wiring to pass from the side step rail interior into the end portions. The end portions can be removed from the side step rail by unfastening the screws or other fasteners and sliding the end portion away from the rail. In this way, other animal designs can be substituted, or switched out.

Figure 2:
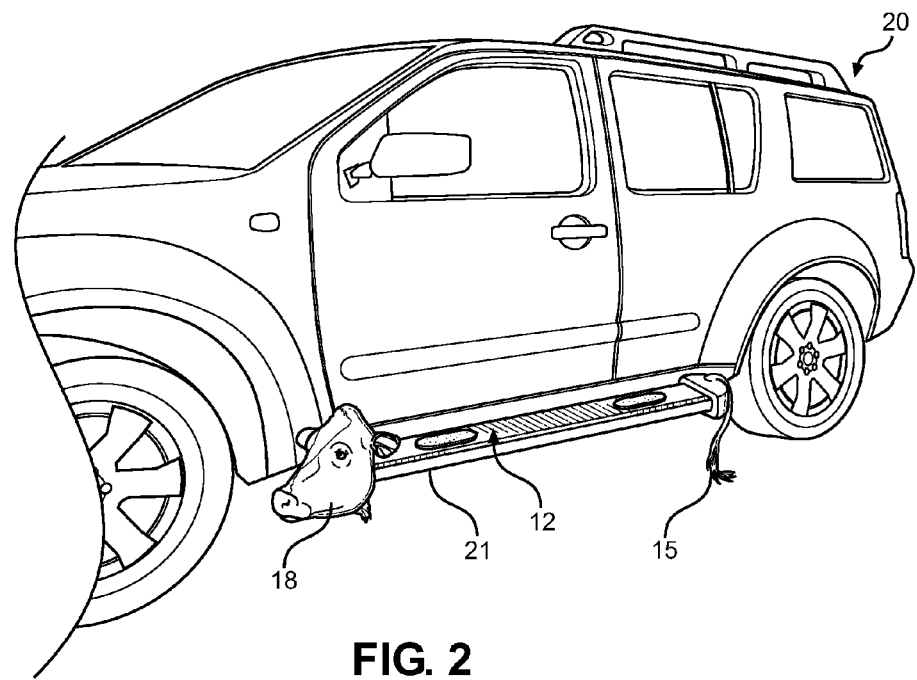
FIG. 2 shows a perspective view of the novelty side-step accessory device installed on the side-step rail of a sport utility vehicle.

Turning now to FIG. 2, there is shown a view of the installed novelty side-step accessory. The parts of the kit are affixed to the upper surface of side step 21 of a motor vehicle 20. A front end portion is am end cap shaped like the head of an animal 18. This front end portion is attached to the leading portion of the side step rail, facing a front wheel. The front end portion is made from a durable water-resistant material, so that it may be easily wiped free of dirt and debris splattered by the tires. At an opposing end of the rail, a rear end portion is an end cap that covers the rear of the side step rail. A decoration shaped like animal tail 15 protrudes from this rear end portion. It is preferred that the end portions and associated decorations are shorter in length than the distance from the side step rail to the ground, so as to prevent the end portions from dragging on the ground during use. When the kit parts are properly installed, the pressure plates are covered by side step covers 12 on the side step rail upper surface.

Figure 3:
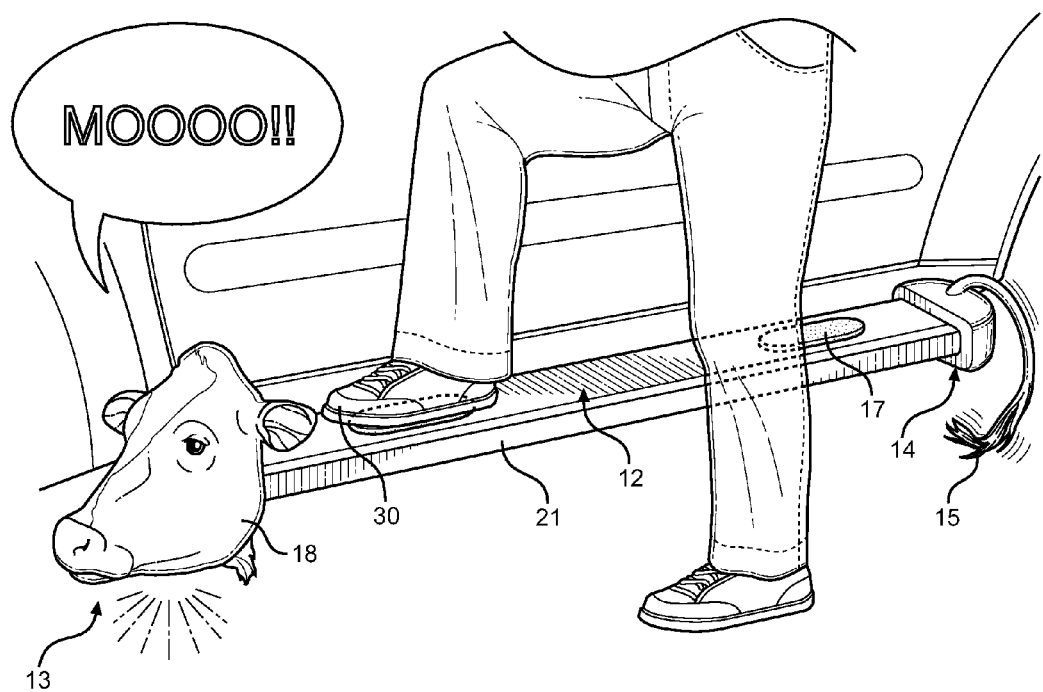
FIG. 3 shows a system diagram view of the novelty side-step modification kit when installed. In this embodiment, the device has the overall appearance of a cow.

The use of the novelty side step accessory is shown in FIG. 3. The step covers 17 are positioned along the vehicle side step rail 12 and secured thereto such that pressure plates are secured between the step covers and the underlying rail. Thus, the exertion of pressure on the step covers transfers load to the pressure plates, thereby activating same. Front and rear end portions 13, 14 are secured to opposing ends caps of the side step. The front end portion resembles a cow head 18, while the rear end portion has a decorative animal tail 15 hanging or protruding from the rearward face.

When a user exerts downward pressure, such as that of a stepping motion, on the step cover enclosed pressure plates 19, a sound emitter housed within the front end portion emits a pre-recorded noise, and a motion generator in the rear portion initiates movement of the tail decoration. Animal calls associated with the embodiment theme are stored as the pre-determined noise. In the depicted example, the cow theme embodiment emits the noise "moooooo" upon activation. Other embodiments may employ one or more different sounds. By way of example, a dog themed embodiment might have the pre-determined noises of "woof", "bark", "uip" or any combination thereof.

Extensive variety exists for themes of the kit. This description particularly refers to animal heads, tails, and sounds because these themes are a part of the preferred embodiment. But it should be noted that all themes may be reasonably applied to the invention. Accessory kits with the front end portion and rear end portion of a car, plane, fire engine truck, or vehicle model similar to that the device is deployed upon may be used. Therefore, this disclosure is intended to encompass all side step accessories having one or more pressure plates electrically connected to a front end portion having a sound emitting means, and a rear portion which may optionally have a motion generator.

Figure 4:
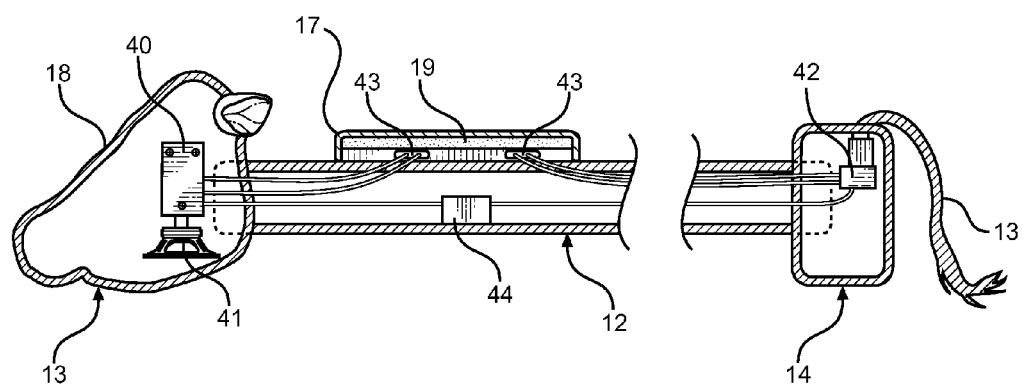
FIG. 4 shows a perspective view of the novelty side-step modification kit in use. A user places their foot on the upper surface of a pressure plate and exerts downward pressure to activate the device.

Referring now to FIG. 4 there is shown a cross sectional view of an exemplary embodiment of the invention. A pair of pressure plates 19 are secured to the upper surface of a side step rail 12 and covered with side step covers 17. The plates themselves may be individually secured, or alternatively may be free, but held in place by pressure between the step cover and underlying rail. A hole is bored through the side step rail to permit passage of electrical wiring from the pressure plates into the hollow interior of the rail. Electrical wiring runs through the rail to the end portions, thereby connecting the pressure plates to the sound emitter and motion generator. Similarly, a battery is connected to the pressure plates. This set up requires minor modification of the side step rail. Such modification is primarily located underneath the side step covers, thus, if the kit is disassembled and removed from the side step rail, the previous modification will not be apparent to onlookers.

One or more pressure plates 19 are disposed on the side step rail 12. A single pressure plate (not shown) may be used to ensure the sound and motion features are activated regardless of where the user exerts pressure on the rail. Two pressure plate regions are shown in the depicted examples to demonstrate that an inactive zone may be provided to users, thereby allowing them to utilize the side step rail without activating the noise and motion features. In either embodiment, the pressure plate(s) is a flat plate having open electrical circuit connections 43 disposed therein. When force is exerted on the plate, the plate material is depressed, closing the circuits and sending electrical signals along wiring connected to the circuits. These signals travel along the wiring to a sound emitter 40 in the front end portion 13 and a motion generator 42 in the rear end portion. In this way, sound and motion are activated via downward exertion on the pressure plate(s).

A the front of the rail is installed a front end portion 13 with an animal head 18 shape. A portion of this end portion has a hollow interior that houses a sound emitter 40 and speaker 41. The speaker may be integrated into the sound emitter or attached thereto. The front end portion should be substantially hollow to permit sound wave propagation. If the head portion is mostly solid, sound waves emitted will be muffled and difficult to hear. The sound emitter device is electrically connected to the pressure plate 19 circuit connections 43 such that signals sent by the connections travel along the wiring to the sound emitter and initiate sound generation. Sounds are pre-recorded within the emitter and may be played in a pre-determined order or at random. Sound waves are emitted via speaker vibration at which time they become audible to a nearby user. The use of basic sound generation and emission set-ups is known in the art of automotive accessories and the specific type of emitter and speaker configuration needed for a particular embodiment of the device will be apparent to one of ordinary skill in the art. For this reason, the specific details of the sound emitter configuration are not addressed within this disclosure.

At the rear end of the rail is installed a rear end portion 14. This end portion has a hanging decoration 15 shaped like an animal tail. Within the end portion is a motion generator 42. The motion generator is electrically connected to the pressure plate 19 circuit connections 43 via wiring. In the simplest embodiment, this motion generator is a vibration motor that initiates vibration upon receipt of electrical signals from the pressure plate. Generated vibrations cause the rear end portion and decoration to vibrate, thereby presenting the appearance of a wiggling or swinging animal tail.

In another embodiment, an articulating arm is employed to provide specific movement features to the decoration. The articulating arm is a series of small rods connected by joints such as pin joints. One end of the arm is connected to the motion generator via a joint, while the rest of the arm extends into the decoration. If the motion generator is a vibration motor, vibratory waves will travel down the articulating arm and cause it to wiggle/pivot/twist according to the permitted motion of the joints. For example, single axis, elbow/knee type pin joints will facilitate movement along that single axis. If the decoration is an elongated tail, multiple rods will be used in the articulating arm to facilitate a "back and forth" swishing motion along the length of the decoration. Shorter tail accessories will require fewer rods in the articulating arm. Further, some points of the articulating arm may be stiffer than others. An upstanding accessory such as that of a rattlesnake or puppy dog, may require that the articulating arm be oriented vertically, with stiffer lower joints to hold the upper rods in position. Other types of motion generators may be used, for example a programmable logic controller may be employed in connection with a robotic articulating arm to elicit precise articulation of the arm. The animal theme of the device may impact the selection of motion generators and it will be known to one of ordinary skill in the art how to select an appropriate mechanism for the embodiment.

An alternative embodiment of the device does not include the motion generator element. The rear end portion is present along with the attached hanging accessory, but the accessory is inert. Sound emission is generated via pressure plate activation but no wiring extends to the rear end portion. This embodiment uses less power and therefore offers a longer battery life than the sound and motion embodiment.

One or more batteries 44 are secured within the hollow interior of the side step rail and are electrically connected to the sound emitter 40 and the motion generator 42. The battery powers these devices, thereby enabling sound emission and motion of the hanging decoration 15. In the depicted example, the battery is shown in a position within the hollow interior region of the rail 12. This is an exemplary disposition, and the battery may be moved into either end portion. Similarly, a battery may be disposed in each end portion rather than having just one battery disposed in the central rail area. In this embodiment the batteries are connected to the circuit connections 43 within the pressure plates 19 and only to the electrical components within their respective end portion. Battery life, and duration of the device's interactive features can thus be prolonged by reducing the drain on each battery.

In a preferred embodiment the end portions are replacement end caps for the side step rail and have cavities disposed along inward faces to receive and retain the ends of the side step rail. Alternatively, the end portions may be held in place with a series of straps that wrap around the side step rail, fasteners, or adhesive.

The invention provides users with a unique way to customize their vehicle side steps. Rather than using paint or decorative decals, the invention offers an aesthetically pleasing interactive decoration. It is a side step rail accessory having two end portions decorated to resemble an animal. Each of these end portions has an interactive feature that is initiated when a person steps on the pressure plates of the accessory. The first interactive feature is a sound emitter that provides playback of sounds related to the visual theme of the device. A second interactive feature is a motion generator that causes the hanging decoration to wiggle or vibrate. In this manner, the kit offers users more than just an aesthetic uniqueness, but also an entertaining experience every time they enter their vehicle.

To this point, the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A novelty vehicle side step rail accessory, comprising:
   a first end portion having a hollow interior and an inward face adapted to secure to a front end of a vehicle side step rail;
   a second end portion having a partially hollow interior and an inward face adapted to secure to a rear end of a vehicle side step rail;
   one or more pressure plates adapted for installation along an upper surface of a vehicle side step rail, and wherein said pressure plates are housed between side step covers and a side step rail upper surface when in use;
   a sound emitter electrically connected to said one or more pressure plates such that pressure exerted on said one or more plates activates sound emission by said sound emitter, and wherein said sound emitter is housed within said front end portion;
   a battery electrically connected to said sound emitter and said one or more pressure plates.

2. The accessory of claim 1, further comprising a hanging accessory secured to said rear end portion.

3. The accessory of claim 1, wherein said front end portion and rear end portion are shaped to resemble a common theme.

4. The accessory of claim 1, wherein said sound emitter has an integrated speaker.

5. A novelty vehicle side step accessory, comprising:
   a first end portion having a hollow interior and an inward face adapted to secure to a front end of a vehicle side step rail;
   a second end portion having a partially hollow interior and an inward face adapted to secure to a rear end of a vehicle side step rail;
   one or more pressure plates adapted for installation along an upper surface of a vehicle side step rail, and wherein said pressure plates are housed between side step covers and a side step rail upper surface when in use
   a sound emitter electrically connected to said one or more pressure plates such that pressure exerted on said one or more plates activates sound emission by said sound emitter, and wherein said sound emitter is housed within said front end portion;
   a motion generator disposed within said rear end portion and electrically connected to said one or more pressure plates such that pressure exerted on said one or more plates activates motion generation by said motion generator and moves said rear end portion;
   one or more batteries electrically connected to said sound emitter, said motion generator and said one or more pressure plates.

6. The accessory of claim 5, further comprising a hanging accessory secured to said rear end portion.

7. The accessory of claim 5, wherein said front end portion and rear end portion are shaped to resemble a common theme.

8. The accessory of claim 5, wherein said sound emitter has an integrated speaker.

9. The accessory of claim 5, wherein said motion generator is a vibration motor.

* * * * *